United States Patent
Andersson

[11] Patent Number: 5,920,279
[45] Date of Patent: Jul. 6, 1999

[54] PROCEDURE AND SYSTEM FOR THE CONTROL OF A NUMBER OF RADAR UNITS

[75] Inventor: Bengt Andersson, Kullavik, Sweden

[73] Assignee: Telefonaktiebolaget LM Ericsson, Stockholm, Sweden

[21] Appl. No.: 09/008,625

[22] Filed: Jan. 16, 1998

[30] Foreign Application Priority Data

Jan. 17, 1997 [SE] Sweden ................................ 9700111
Jan. 17, 1997 [SE] Sweden ................................ 9700112

[51] Int. Cl.$^6$ ........................................................ G01S 7/28
[52] U.S. Cl. .............................. 342/59; 342/82; 342/89; 342/198; 342/203
[58] Field of Search ................................ 342/59, 82, 89, 342/91, 92, 94, 159, 173, 175, 198, 203

[56] References Cited

U.S. PATENT DOCUMENTS

| 3,161,870 | 12/1964 | Pincoffs | 342/59 |
|---|---|---|---|
| 3,162,583 | 12/1964 | Eradsell | 208/407 |
| 3,618,088 | 11/1971 | Simpson, Sr. | 342/59 |
| 3,731,310 | 5/1973 | Rittenbach | 342/59 |
| 4,336,538 | 6/1982 | Radford | 342/175 |
| 5,136,300 | 8/1992 | Clarke et al. | 342/175 |
| 5,140,332 | 8/1992 | Martin et al. | 342/202 |
| 5,302,955 | 4/1994 | Schutte et al. | 342/59 |
| 5,341,141 | 8/1994 | Frazier et al. | 342/59 |
| 5,448,243 | 9/1995 | Bethke et al. | 342/59 |

FOREIGN PATENT DOCUMENTS

| 0 251 498 | 1/1988 | European Pat. Off. . |
|---|---|---|
| 62-153785 | 7/1987 | Japan . |
| 2 093 306 | 8/1982 | United Kingdom . |

Primary Examiner—John B. Sotomayor
Attorney, Agent, or Firm—Burns, Doane, Swecker & Mathis, L.L.P.

[57] ABSTRACT

A procedure and a system increase the performance of a group of radar units. The radar units are arbitrarily located in such a way that the respective antenna beam of a radar unit functioning as a normal radar at least partially coincides with the antenna beam of at least one other radar unit in the group. The radar units are synchronised to transmit alternately and in turn, preferably with an increased energy output. All the radar units in the system are synchronised to work continuously in their ordinary reception mode. In this way at each moment echo signals originating from the radar unit transmitting at that moment are received and processed.

12 Claims, 2 Drawing Sheets

PROCEDURE AND SYSTEM FOR THE CONTROL OF A NUMBER OF RADAR UNITS

This application claims priority under 35 U.S.C. §§119 and/or 365 to 9700111-9 & 9700112-7 filed in Sweden on Jan. 17, 1997; the entire content of which is hereby incorporated by reference.

BACKGROUND

This invention concerns a procedure for the co-ordination of at least two radar units in order thereby to achieve performance benefits. This invention also concerns a system comprising at least two radar units which are controlled in a co-ordinated way in order thereby to achieve performance benefits. This application is based on applications No. 9700111-9 and 9700112-7 filed on Jan. 17, 1997 in Sweden, the contents of which are incorporated hereinto by reference.

The performance of a radar unit and in particular of a reconnaissance radar is usually given in the form of its range. A suitable measurement of the range is the distance at which an approaching radar target is first detected by the radar unit with a particular probability.

An increase in the range can, for example, be achieved by means of an increase in the power output (average power) of the radar unit, by means of a larger antenna or by reducing the noise factor of the radar unit. An increase in a radar unit's power output usually leads to its output stage needing to be replaced by one or more larger output stages with higher output. This leads unavoidably to a larger cooling requirement for the output stage(s) and a higher power consumption which results in a need for a more powerful power supply. The costs and the space requirements increase rapidly. In certain applications, for example in an aircraft, there is only a predetermined limited space available for a radar unit. Radar applications where the radar unit must be located in a place with one or more physical restrictions, usually makes impossible any extensions of the radar unit in excess of the allocated space, the cooling capacity and/or the power supply.

It is already known that there is a co-ordination benefit if two or more radar transmitters co-operate by frequency division multiplexing with sufficiently separated frequencies. The radar receivers are designed so that it is possible to simultaneously receive and process signals with the two or more microwave frequencies used at the time. This means that the receiver branches to a certain extent have to be doubled (for co-operation between two radar units), but certain broad band units (such as antennas) can, however, be in common. The American patent U.S. Pat. No. 3,161,870 and also to a certain extent the American patent U.S. Pat. No. 5,302,955 show such systems. It can, however, be considered to be a disadvantage that each radar unit that is included in a frequency division multiplexing system has to include an extra receiver branch for each radar unit that is included in the system. From the space aspect alone a frequency division multiplexing system is therefore probably not a realistic way of increasing the performance of airborne radar systems. It can also be considered to be a disadvantage that a system with three co-operating radar units requires three receiver branches in each radar unit, which results in an extremely expensive system. It can also be considered to be a disadvantage that a frequency division multiplexing system is a hardware-dependent system which results in a very inflexible system which can possibly be accepted in a permanent ground-based system. The fact that a frequency division multiplexing system is a hardware-dependent system means that it must be determined in advance which radar units are to be included in such a system and also how many radar units are to be included in each system.

SUMMARY

One object of this invention is to describe a procedure and a system for increasing the performance of a number of radar units by means of co-ordination.

Another object of the invention is to describe a procedure and a system for increasing the performance of a number of radar units, without the disadvantages mentioned above, by means of co-ordination.

Another object of the invention is to describe a procedure and a system for the flexible co-ordination of a number of radar units.

A further object of the invention is to describe a procedure and a system for increasing the performance of a number of co-ordinated radar units without increasing the total energy consumption.

The above mentioned objects are achieved according to the invention by a procedure and a system for increasing the performance of a group of radar units. The radar units can be arbitrarily located in such a way that the respective antenna beam of a radar unit functioning as a normal radar temporally and spatially at least partially coincides with the antenna beam of at least one other radar unit in the group. According to the invention at least during antenna beam coincidence each radar unit in question has at least one respective period of time which is divided into a first partial period of time and a second partial period of time. During the first partial period of time the transmitted radar pulses for the measurement of target data are transmitted with a higher energy content than what is possible in a steady state. This is done in such a way that the transmitted energy of the radar unit in question during the period of time amounts at the most to the possible energy transmission of the radar unit in question in a steady state during a corresponding period of time. During the second partial period of time no radar pulses for the measurement of target data are transmitted. Preferably the first and the second partial periods of time are each at least twice as long as a pulse repetition interval which is used during the first partial period of time. Further according to the invention at least during coinciding beams the radar units in question are synchronised to transmit alternately and in turn during their respective first partial period of time. All the radar units in the system are also synchronised to work continuously in their ordinary reception mode, in order that at each moment echo signals originating from the radar unit transmitting at that moment can be received and processed. According to an advantageous embodiment the ratio between each respective period of time and each corresponding first partial period of time is proportional to the higher energy content of the respective radar pulses during each corresponding first partial period of time. Preferably the synchronisation is included in an exchange of information between the radar units. Advantageously the exchange of information also includes the spatial location of the radar units. In a preferred embodiment all the radar units transmit for a substantially equal length of time in turn.

The above mentioned objects are also achieved according to the invention by a procedure and a system for increasing the performance of a group of radar units. The radar units are arbitrarily located in such a way that the respective antenna beam of a radar unit functioning as a normal radar at least partially coincides with the antenna beam of at least one other radar unit in the group. According to the invention at least during antenna beam coincidence the radar units in question are synchronised to transmit alternately and in turn. All the radar units in the system are synchronised to work continuously in their ordinary reception mode. The synchronisation is included in an exchange of information between the radar units. This enables that at each moment echo signals originating from the radar unit transmitting at that moment can be received and processed at least by radar units with coinciding antenna beams.

The above mentioned objects are also achieved according to the invention by means of a procedure for increasing the performance of a group of radar units. The radar units can be arbitrarily located in such a way that the respective antenna beam of a radar unit functioning as a normal radar at least partially coincides with the antenna beam of at least one other radar unit in the group. According to the procedure the radar units are synchronised to transmit alternately and in turn. All the radar units in the system are synchronised according to the procedure, also to work continuously in their ordinary reception mode. In this way at each moment echo signals originating from the radar unit transmitting at that moment can be received and processed. It is advantageous if the synchronisation is included in an exchange of information between the radar units. It is advantageous if the exchange of information also includes the location of the radar units. A variant of the procedure is that the alternating transmission involves all the radar units transmitting for an equal length of time in turn. An advantageous variant of the procedure is for the radar unit that is transmitting at the moment to transmit radar pulses with an increased energy in relation to the possible energy transmission of the radar unit in a steady state.

the above mentioned objects are also achieved according to the invention by means of a system for increasing the performance of a group of radar units. The system involves a number of radar units being arbitrarily located in such a way that the respective antenna beam of a radar unit functioning as a radar at least partially coincides with the antenna beam of at least one other radar unit in the system. The radar units are synchronised to transmit alternately and in turn. All the radar units in the system are synchronised to work continuously in their ordinary reception mode. In this way at each moment echo signals originating from the radar unit transmitting at that moment can be received and processed. It is advantageous if the synchronization is included in an exchange of information between the radar units. It is advantageous if the exchange of information also includes the location of the radar units. A variant of the procedure is that the alternating transmission involves all the radar units transmitting for an equal length of time in turn. An advantageous variant of the procedure is for the radar unit that is transmitting at the moment to transmit radar pulses with an increased energy in relation to the possible energy transmission of the radar unit in a steady state.

This invention has a number of advantages for the increase in performance of co-ordinated radar units compared with previously known techniques. The invention does not require an extensive modification of existing radar units involving, for example, a number of receiver branches. The invention is flexible and can be simply adapted for systems with different numbers of radar units. A radar unit that is adapted in accordance with the invention in order to be able to work in a co-ordinated system with several radar units is not restricted only to working together with other radar units but can also work autonomously. The radar units that are included in a co-ordinated system in accordance with the invention do not need to transmit more energy during a co-ordinated cycle than what the respective radar unit can transmit normally when it is working autonomously and in spite of this a co-ordinated radar system according to the invention results in increased performance for the radar units.

BRIEF DESCRIPTION OF THE DRAWINGS

In the following the invention will be described in greater detail for the purpose of explanation and in no way for the purpose of restriction, with reference to the attached figures, where.

DETAILED DESCRIPTION

Figure 1:
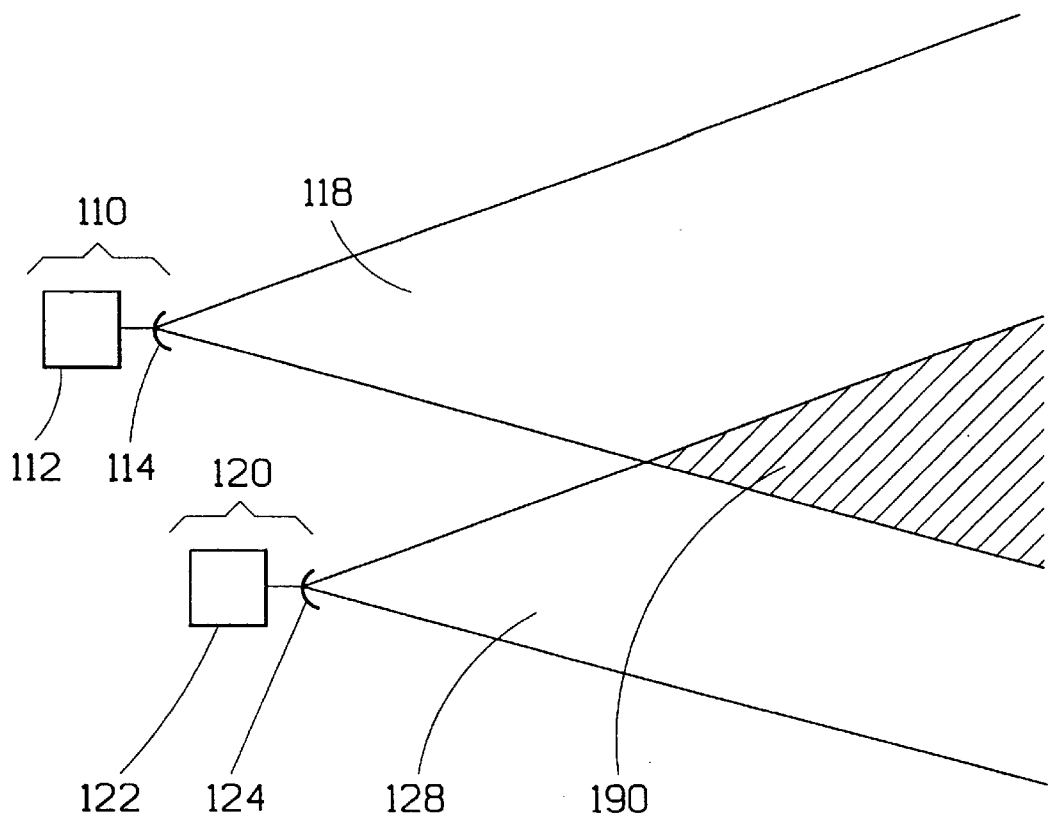
FIG. 1 shows a block diagram of two radar units in a system in accordance with the invention.

In order to clarify the invention some examples of its application will be described in the following with reference to the FIGS. 1 to 3.

According to the invention, by means of co-operation between two or more available radar units/systems/stations considerably better performance is achieved than what would be achieved by the autonomous use of the respective radar units. Targets that, due to their geometric shapes, present a small equivalent target area to each individual radar unit can have a greater probability of detection as a result of radar units co-operating. Target echo signals from targets that disperse radar signals in other directions than back to the radar unit that transmits the radar signals can be received by another radar unit that is co-operating with the transmitting radar unit and is situated in a different location to this. Better performance is achieved by means of a more efficient target echo integration as the co-operating radar units advantageously momentarily increase their transmitted average power. These improvements are possible in accordance with the invention if the antenna beams of the radar units at least partially coincide during the course of the radar operation.

In a first example it is assumed that two identical radar units are available, each generating an output P (average power). If the antenna beams coincide at least partially, a gain in performance is made possible by means of each radar unit receiving target echo signals originating partially from its own radar transmitter and partially from the other radar transmitter. The co-operation according to the invention, takes place by time division multiplexing. Time division multiplexing according to the invention means that one radar unit transmits at a time, that is to say that the radar units in the system transmit alternately. The preconditions for which radar units are included in a co-operating system can quickly be changed, even several times during one sweep, as the radar units that are included in the system have partially coinciding antenna beams.

Radar units in a system according to the invention are synchronised so that all the radar units in the system know which radar unit is transmitting and when. The synchronisation is carried out suitably by means of an exchange of information between the radar units. The exchange of information can be carried out in many different ways, such as for example position coding of the radar signals, wireless or fixed data links. The exchange of information can suitably also include the position of the radar unit, except possibly in a system where the radar units are in a fixed location, for shorter or longer intervals of time and where the locations of the radar units in the system are known and pre-programmed. Mobile radar units can, for example, calculates their location in space using GPS and for airborne radar units also using altimeters. If the radar units in the system know each other's location and preferably also the direction of each others' antenna beams and when they transmit, the received target echoes can be attributed to the "correct" bin (resolution element, gate) or adjacent bin. The information in the bins of the radar units can for example be transferred to one of the radar units in the system or possibly to a co-ordination centre where it is centrally signal-processed and co-ordinated further.

In an example with two radar units co-operating, each radar unit transmits preferably with momentarily doubled output (2P) for a certain period of time, topically 50 ms, followed by an equally-long period of radar silence. Over a longer period (in this example 100 ms) it is the case that the average output for each radar unit on average is unchanged (=P). During the co-operating both the radar transmitters transmit alternately. Both radar receivers continually receive target echo signals that were originally generated via both the transmitters. Target echo integration (coherent integration and/or video integration) is carried out in the usual way during a 50 ms interval. Compared with an autonomous radar unit four times as many measurements are obtained during a 100 ms interval, where each measurement provides the same received target echo energy as in the autonomous case, that is to say each radar unit (two in number) receives once from their own and once from the other (2*(1+1)=4). The precondition for each measurement (four in number) in a 100 ms interval in this variant having the same target echo energy as one measurement provides during a 100 ms interval in the autonomous case depends wholly upon whether it is possible to control each radar unit so that it provides double power output during a 50 ms interval. Even a moderate increase in the output of the radar units during a, in this example, 50 ms interval provides a useful increase in performance of this kind.

Depending upon the design of the radar unit and the application, measurements can be further processed in various ways such as autonomously in each radar unit or co-ordinated by all the radar units in the system. For example the presence of a target can be determined if threshold crossing took place in any of the four possible cases (two per radar unit with two radar units in a system). In other cases it can be most suitable to have binary integration of the type m/n, that is to say there must at the same time be threshold crossing in m (for example 3) out of n (n=4) in the same resolution element for target recognition. For each resolution element each radar unit must thus provide information about the number of threshold crossings (none, one or two for each radar unit). Final target approval takes place when there is a total of three or four threshold crossings. The procedure with binary integration is more complex compared to the first case as only one threshold crossing is required, but gives better range in many cases, particularly for targets of SW0 character (Swerling=0, constant target area with regard to time and frequency). A further method is to video integrate the signals for the same resolution element from the four different measurements. The method is more complicated than binary integration and provides only moderate additional performance compared with binary integration.

FIG. 1 shows two radar units 110, 120 with partially coinciding 190 antenna beams 118, 128. The radar units 110, 120 can be fixed radar units or mobile units such as for example airborne or vehicle-based units. Each radar unit 110, 120 comprises an antenna 114, 124 and a Send/Receive unit 112, 122. The radar units can, for example, be designed in accordance with the radar unit that is depicted in FIG. 2.

Figure 2:
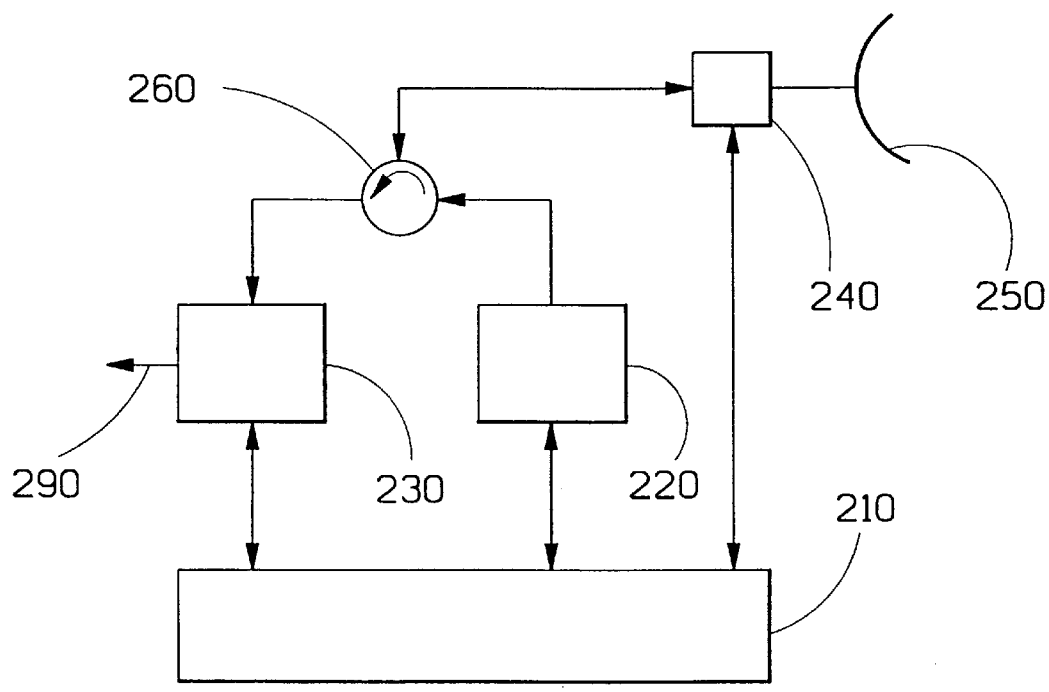
FIG. 2 shows a block diagram of a radar unit that is suitable for use in a system in accordance with the invention.

FIG. 2 shows a block diagram of a radar unit of the kind that, for example, can be used for the invention. The radar unit comprises a control unit 210, a transmitter 220, a receiver 230, an antenna control unit 240, an antenna 250 and a Send/Receive selector/circulator 260. The control unit 210 controls the transmitter 220 so that it transmits radar pulses via the Send/Receive selector and the antenna 250. The antenna 250 together with the antenna control unit 240 can be mechanically controlled so that sweeps with the antenna beam only results from the antenna 250 physically moving. The antenna 250 can preferably be electronically controlled (ECA—Electronically Controlled Antenna) which results in an antenna beam that is easy to control and can be positioned flexibly. In certain applications the antenna 250 can be fixed. A target echo signal is returned to the radar unit via the antenna 250 and the Send/Receive selector 260 to the receiver 230. Further signal processing and display is carried out on the signals 290 from the receiver 230 and is not shown in the figure. According to one embodiment of the invention the control unit 210 controls the transmitter 220 in such a way that the transmitter 220 during a predetermined time, transmits radar pulses with a higher average power than the nominal average power of the radar unit. The higher transmitted average power is preferably a doubling of the average power compared with the nominal average power of the radar unit. The increase in average power takes place preferably by means of a lengthening of the radar pulses. The predetermined time that the transmitter 220 transmits with a higher average power is in proportion to the increase in the average power and is maximised to the time a standardised target remains in a range bin/resolution element (range window, range gate) which can be of the order of 50–200 milliseconds. The control unit 210 controls the transmitter 220 to give radar silence in proportion to the increase in output and the duration of the increase so that the transmitted average power over longer periods of time (of the order of seconds) is the same as the nominal average power of the radar unit.

Described in another way one period of time is divided into a first and a second partial period of time, where the first and the second partial periods of time are each at least twice as long as a pulse repetition interval which is used during the first partial period of time. As described above the first partial period of time is preferably in the order of 50–200 milliseconds. During the first partial period of time the radar unit is controlled so that it transmits radar pulses for the measurement of target data with a higher energy content than what is possible in a steady state. The control is carried out in such a way that the transmitted energy of the radar unit during the period of time amounts at the most to the possible energy transmission of the radar unit in a steady state during a corresponding period of time. A more efficient signal integration is thereby obtained by means of the signal integration of the target echoes that originate from the radar unit being concentrated during the first partial period of time. The radar unit is also controlled so that it does not transmit radar pulses for the measurement of target data during the second partial period of time.

Figure 3:
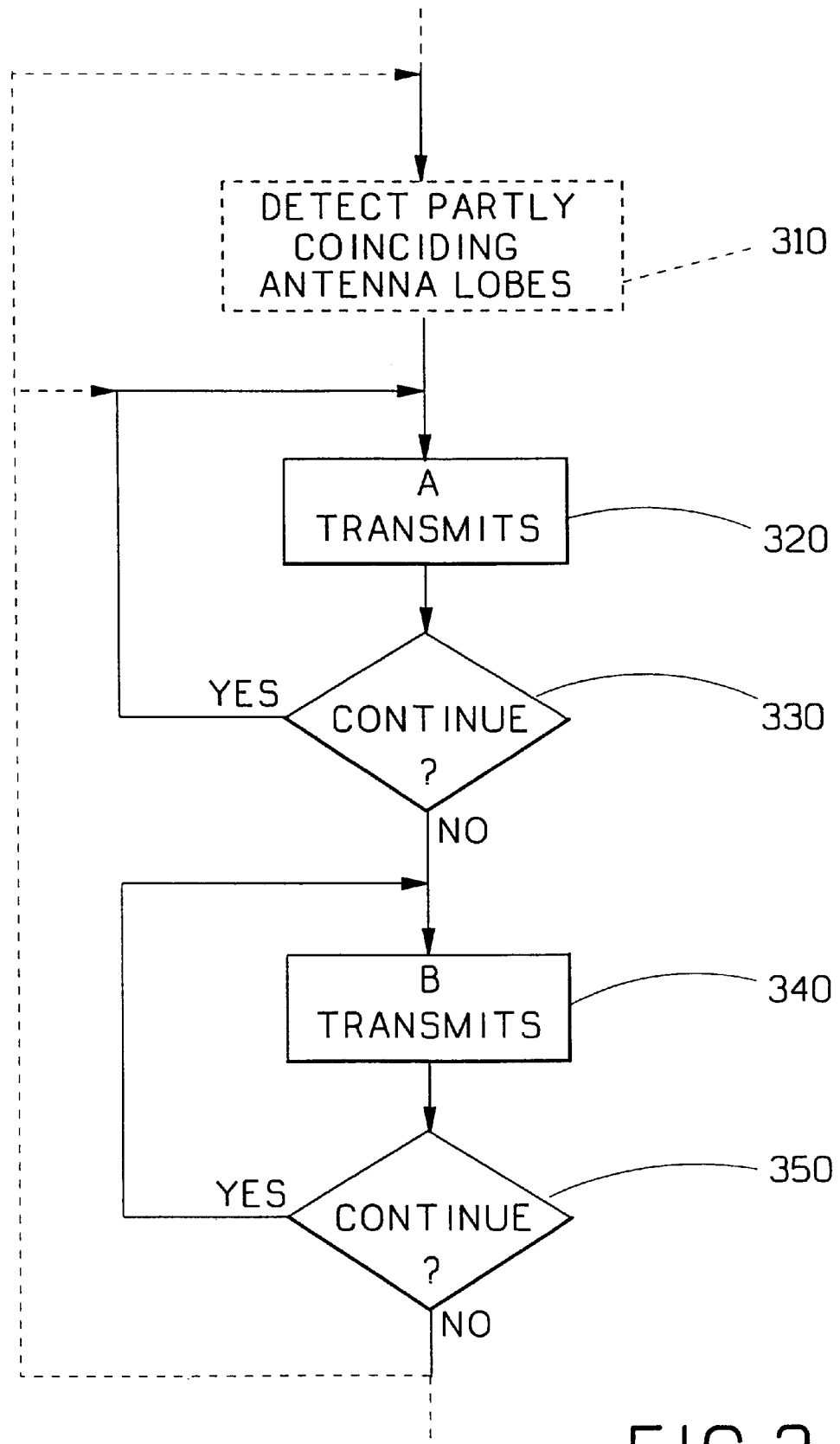
FIG. 3 shows a flow diagram of a procedure in accordance with the invention.

FIG. 3 shows a flow diagram of a procedure according to the invention for systems with two radar units. For mobile radar units and possibly also for fixed radar units with moveable antenna beams, a detector state 310 detects whether the antenna beams partially coincide. Thereafter the first radar unit is synchronised to transmit and the second radar unit not to transmit in a first transmission stage 320. Both radar units receive and process radar signals continually. If required the radar units are controlled so that they transmit radar pulses with an increased output in accordance with the methods described above. A first test stage 330 ensures that the first radar unit only transmits during a pre-determined time, which for example can be of the order of 50 ms. Thereafter in a second transmission stage 340 the first radar unit stops transmitting and the second radar unit begins to transmit. A second test stage 350 ensures that the second radar unit only transmits for an equal length of time as the first radar unit, as there are only two radar units involved in this example. Thereafter the procedure is continued with, for example, other signal processing stages or goes to the first transmission stage 320 or to the detection stage 310.

The examples described above are where the performance of a radar unit can be increased using co-operating radar units with partially coinciding antenna beams. With partially overlapping antenna beams there are alternative variants of the invention, for example the antenna speed (the sweep speed) is doubled by the Time on Target being adapted to the transmission time of each of the two radar units. This results in a doubling of the data rate at the expense of possible integration during the Time on Target, obtaining two primary probabilities of detection (one per radar) instead of a total of four as in the basic version of the invention. Another variant of the invention is to improve the tracking performance for a target by locking partially coinciding antenna beams on the target.

The invention concerns co-operation between two or more radar stations which have at least partially overlapping antenna beams, in order to achieve improved performance. The co-operation takes place by time division multiplexing with preferably momentarily increased average power of the radar transmitters which also makes possible more efficient integration on account of shorter primary integration Times.

This invention is not restricted to the embodiments mentioned above, but can be varied within the framework of the following Patent Claims.

What is claimed is:

1. Procedure for increasing the performance of a group of radar units where the radar units are arbitrarily located in such a way that the respective antenna beam of a radar unit functioning as a normal radar temporally and spatially at least partially coincides with the antenna beam of at least one other radar unit in the group, wherein at least during antenna beam coincidence each radar unit in question has at least one respective period of time which is divided into a first partial period of time during which radar pulses for the measurement of target data are transmitted with a higher energy content than what is possible in a steady state, in such a way that the transmitted energy of the radar unit in question during the period of time amounts at the most to the possible energy transmission of the radar unit in question in a steady state during a corresponding period of time, and a second partial period of time during which radar pulses for the measurement of target data are not transmitted, where the first and the second partial periods of time are each at least twice as long as a pulse repetition interval which is used during the first partial period of time, and in that at least during coinciding beams the radar units in question are synchronised to transmit alternately and in turn during their respective first partial period of time, and all the radar units in the system are synchronised to work continuously in their ordinary reception mode, in order that at each moment echo signals originating from the radar unit transmitting at that moment can be received and processed.

2. Procedure according to claim 1, wherein the ratio between each respective period of time and each corresponding first partial period of time is proportional to the higher energy content of the respective radar pulses during each corresponding first partial period of time.

3. Procedure according to claim 1 or 2, wherein the synchronisation is included in an exchange of information between the radar units.

4. Procedure according to claim 3, wherein the exchange of information also includes the spatial location of the radar units.

5. Procedure according to any of Patent claims 1 to 4, wherein the alternating transmission involves all the radar units transmitting for a substantially equal length of time in turn.

6. Procedure for increasing the performance of a group of radar units where the radar units are arbitrarily located in such a way that the respective antenna beam of a radar unit functioning as a normal radar at least partially coincides with the antenna beam of at least one other radar unit in the group, wherein at least during antenna beam coincidence the radar units in question are synchronised to transmit alternately and in turn, and all the radar units in the system are synchronised to work continuously in their ordinary reception mode, where the synchronisation is included in an exchange of information between the radar units, in order that at each moment echo signals originating from the radar unit transmitting at that moment can be received and processed at least by radar units with coinciding antenna beams.

7. System for increasing the performance of a group of radar units where the system comprises a number of radar units arbitrarily located in such a way that the respective antenna beam of a radar unit functioning as a normal radar temporally and spatially at least partially coincides with the antenna beam of at least one other radar unit in the group, wherein at least during antenna beam coincidence each radar unit in question has at least one respective period of time which is divided into a first partial period of time during which radar pulses for the measurement of target data are transmitted with a higher energy content than what is possible in a steady state, in such a way that the transmitted energy of the radar unit in question during the period of time amounts at the most to the possible energy transmission of the radar unit in question in a steady state during a corresponding period of time, and a second partial period of time during which radar pulses for the measurement of target data are not transmitted, where the first and the second partial periods of time are each at least twice as long as a pulse repetition interval which is used during the first partial period of time, and wherein at least during coinciding beams the radar units in question are synchronised to transmit alternately and in turn during their respective first partial period of time, and all the radar units in the system are synchronised to work continuously in their ordinary reception mode, in order that at each moment echo signals originating from the radar unit transmitting at that moment can be received and processed.

8. System according to claim 7, characterized in that the ratio between each respective period of time and each corresponding first partial period of time is proportional to the higher energy content of the respective radar pulses during each corresponding first partial period of time.

9. System according to claim 7 or 8, wherein the synchronisation is included in an exchange of information between the radar units.

10. System according to claim 9, wherein the exchange of information also includes the location of the radar units.

11. System according to claim 7, wherein the alternating transmission involves all the radar units transmitting for a substantially equal length of time in turn.

12. System for increasing the performance of a group of radar units where the system comprises a number of radar units arbitrarily located in such a way that the respective antenna beam of a radar unit functioning as a normal radar at least partially coincides with the antenna beam of at least one other radar unit in the group, wherein at least during antenna beam coincidence the radar units in question are synchronised to transmit alternately and in turn, and all the radar units in the system are synchronised to work continuously in their ordinary reception mode, where the synchronisation is included in an exchange of information between the radar units, in order that at each moment echo signals originating from the radar unit transmitting at that moment can be received and processed at least by radar units with coinciding antenna beams.

* * * * *